UNITED STATES PATENT OFFICE 2,175,187

AZO DYESTUFFS CONTAINING A HEAVY METAL IN A COMPLEX FORM

Ernst Fellmer, Leverkusen-I. G. Werk, Germany, assignor to General Aniline Works, Inc., New York, N. Y., a corporation of Delaware No Drawing. Application March 4, 1938, Serial No. 193,853. In Germany November 25, 1933

6 Claims. (Cl. 260—145)

The present invention relates to new azo dyestuffs containing a heavy metal in a complex form, more particularly it relates to azo dyestuffs which may be represented by the following general formula:

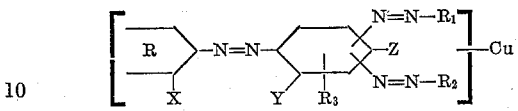

wherein X stands for the hydroxy or carboxylic acid group, Y stands for the hydroxy, the amino or a substituted amino group and Z means the same as Y, wherein R means a radical of the benzene or naphthalene series, $R_1$ and $R_2$ stand for radicals of diazotization components suitable for producing azo dyestuffs, at least one of the radicals $R_1$ and $R_2$ belonging to the naphthalene series, and $R_3$ stands for hydrogen, hydroxyl alkyl, halogen, —COOH or —$SO_3H$.

My new dyestuffs are obtainable by starting with a monoazo dystuff of the general formula:

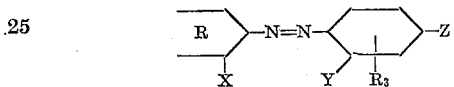

wherein X stands for hydroxyl, alkoxy, halogen, or the carboxylic acid group, Y, Z, R and $R_3$ mean the same as stated above, coupling the same simultaneously or successively with two molecules of identical or different diazotization components whereby at least one of these diazotization components belongs to the naphthalene series and transforming the dyestuffs into the copper complex compounds of the corresponding o-hydroxy or o-carboxy azo dyestuffs. This transformation into the copper complex compounds may be performed according to known methods either in the final dyestuffs or in an intermediate stage of the dyestuff preparation, either in an acid, neutral or an alkaline medium. It is self understood that in case there are used as starting compounds such azo dyestuffs of the above-identified second formula, in which X stands for alkoxy or halogen, the conditions of working must be chosen in such a manner that the alkoxy group is split up or the halogen atom is replaced by a hydroxy group in the manufacture of the heavy metal complex compounds. Besides the manufacture of the new dyestuffs may be carried out in a different order as for instance by coupling the diazo component bearing the lake-forming group only in the second place with the azo component. Occasionally by such variations differing shades may be obtained.

The new copper containing dyestuffs are in form of their alkali metal salts generally dark, water soluble powders, dyeing leather generally even shades of excellent fastness to light. The dyestuffs are in general suitable for dyeing both chromium and vegetable tanned leather. Further my new heavy metal compounds can be suitable for dyeing animal and vegetable fibers.

The present application is a continuation in part of my copending application Ser. No. 753,785, filed November 19, 1934, now Patent No. 2,111,559, issued March 22, 1938.

The invention is illustrated by the following examples, without being limited thereto, the parts being by weight:

Example 1

The diazo compound prepared from 20.7 parts of 2-chloroaniline-4-sulfonic acid is coupled in an acid medium with 11 parts of resorcinol, and when the coupling is complete, the monoazo dyestuff is salted out and filtered. The dyestuff is then suspended in water and transformed into its copper complex compound by heating it for several hours to 90–100° C. with 24.9 parts of crystallized copper sulfate with 80 parts of aqueous caustic soda lye of 30% strength. After cooling the copper complex compound is isolated from the acidified solution, suspended in water and coupled in soda alkaline solution with the diazo compound from 22.3 parts of naphthionic acid and then with that from 13.8 parts of p-nitraniline. The dyestuff having in the free state, i. e. in the form of the free acid, the following formula:

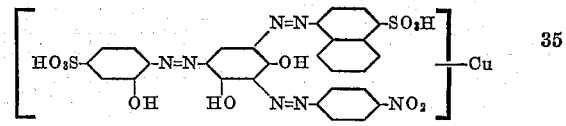

is isolated in the usual manner; it dyes leather deep reddish-brown shades.

Example 2

The diazo compound of 19.9 parts of 4.6-dinitro-2-aminophenol is coupled with 11 parts of resorcinal in an alkaline medium. The isolated monoazodyestuff is again stirred into water and then—in the presence of caustic soda lye—coupled first with the diazo compound of 22.3 parts of 1-naphthylamine-4-sulfonic acid and, when this coupling is complete, with the diazo compound of 22.3 parts of 1-naphthylamine-5-sulfonic acid. The trisazodyestuff separated by adding salt, is transformed into its copper complex compound by heating it for one and a half hours to 70° C. with a copper ammonia solution prepared from 24.9 parts of crystallized copper sulfate. The dyestuff, which is isolated in the usual manner, corresponds in its free state, i. e., in the form of the free acid, to the following formula:

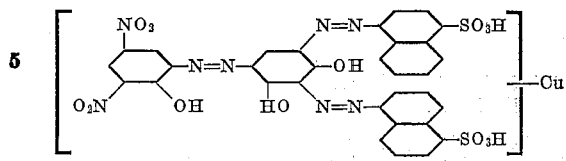

it dyes leather red-brown shades.

Example 3

The diazo compound of 13.7 parts of o-amido benzoic acid is coupled in a soda alkaline solution with 11 parts of resorcinol. The isolated monoazodyestuff is again stirred into water and successively coupled in a sodium hydroxide alkaline medium with the diazo compounds of 30.3 parts of 2-naphthylamine-6.8-disulfonic acid and 13.8 parts of o-nitraniline. When the coupling is complete, the dyestuff is salted out, again stirred into water, made alkaline by adding ammonia, and heated for 2 hours to 70° C. with a copper ammonia solution prepared from 24.9 parts of crystallized copper sulfate. The copper containing dyestuff which is salted out corresponds in its free state, i. e., in the state of the free acid, to the following formula:

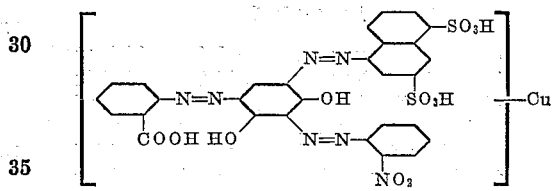

and dyes leather yellow-brown shades.

Example 4

The diazo compound of 28.4 parts of 6-nitro-1.2-aminonaphthol-4-sulfonic acid is added to a concentrated solution of 11 parts of resorcinol made alkaline by adding caustic soda lye. When the coupling is complete, the mixture is made ammoniacal by adding ammoniumchloride and heated after the addition of a copper ammonia solution prepared from 24.9 parts of crystallized copper sulfate for one and a half hours to 70–80° C. When cooled the copper complex compound of the monoazodyestuff is isolated, again stirred into water and coupled in alkaline medium first with the diazo compound of 22.3 parts of 1-naphthylamine-4-sulfonic acid and, when this coupling is complete, with the diazo compounds of 13.8 parts of p-nitraniline. The copper containing dyestuff which is salted out corresponds in its free state, i. e., in the form of the free acid, to the following formula:

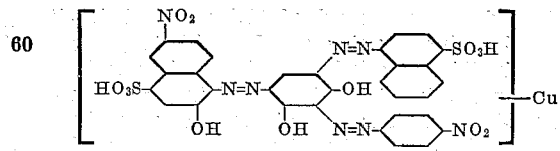

and dyes leather somewhat violettish, dark-brown shades.

Example 5

11 parts of resorcinol are coupled in a soda alkaline solution with the diazo compound of 40.6 parts (two molecular parts) of 1-amino-2-methoxybenzene-5-sulfonic acid and then, after the coupling is complete, in the presence of caustic soda lye, with the diazo compound of 14.3 parts of α-naphthylamine. The mixture is made ammoniacal and heated for 2 hours to 70° C. with a copper ammonia solution prepared from 49.8 parts of crystallized copper sulfate in order to transform into the double copper complex compound. The dyestuff which is isolated in the usual manner corresponds in the free state, i. e., in the form of the free acid, to the following formula:

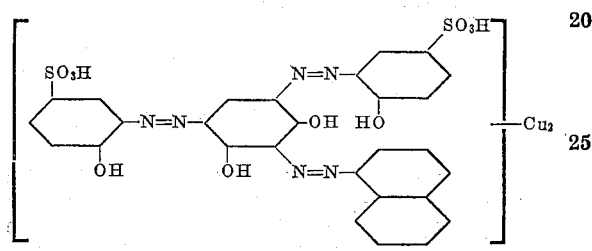

dyes leather brown shades.

Example 6

The diazo compound of 18.9 parts of 2-aminophenol-4-sulfonic acid is coupled with a soda alkaline solution of 10.9 parts of m-aminophenol. The monoazodyestuff separated by adding salt is stirred again into water, and coupled, in the presence of caustic soda lye, with the diazo compound of 30.9 parts of 4'-nitro-4-aminodiphenylamine-2'-sulfonic acid and, when this coupling is complete, with the diazo compound of 22.3 parts of 2-naphthylamine-6-sulfonic acid. The mixture is first acidified, then made alkaline by adding ammonia and—after the addition of a copper ammonia solution prepared from 24.9 parts of crystallized copper sulfate—kept for about 2 hours at a temperature of 70–80° C. The copper complex compound which is isolated in the usual manner corresponds in the free state, i. e. in the form of the free acid, to the following formula:

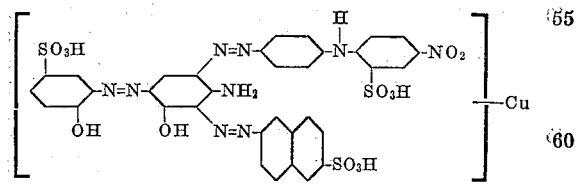

Further examples illustrating the invention are stated in the following table:

| Diazo component bearing the lake-forming group (R) | Azo component | First diazo component (R₁) | Second diazo component (R₂) | Metal | Shades on leather |
|---|---|---|---|---|---|
| 2 - chloroaniline - 4 - sulfonic acid. | Resorcinol | Naphthionic acid | 2 - aminonaphthalene - 8-sulfonic acid. | Copper | Brown. |
| Picramic acid | ___do___ | ___do___ | Aminoazobenzene - sulfonic acid. | ___do___ | Do. |
| 6 - nitro - 2 - aminophenol - 4-sulfonic acid. | ___do___ | o-Nitraniline | 2 - aminonaphthalene - 7-sulfonic acid. | ___do___ | Reddish dark brown. |
| Do | ___do___ | ___do___ | 4 - nitro - 1 - aminonaphthalene - 5 - sulfonic acid. | ___do___ | Reddish-brown. |

| Diazo component bearing the lake-forming group (R) | Azo component | First diazo component (R₁) | Second diazo component (R₂) | Metal | Shades on leather |
|---|---|---|---|---|---|
| 4-chloro-2-aminophenol | 1, 3, 5-trihydroxybenzene. | 1 - aminonaphthalene - 5-sulfonic acid. | 2' - nitro - 4 - aminodiphenylamine - 4' - sulfonic acid. | ___do___ | Dark brown. |
| Do | ___do___ | Dehydrothiotoluidine - sulfonic acid (obtained by sulfonating). | 2 - aminonaphthalene - 8-sulfonic acid. | ___do___ | Brown. |
| 4-nitro-2-aminophenol | 6 - chloro - 3 - aminophenol. | 2 - aminonaphthalene - 4.8-disulfonic acid. | p-Nitraniline | ___do___ | Do. |
| Do | 1.3 - dihydroxybenzene - 4-carboxylic acid. | 2 - aminonaphthalene - 6-sulfonic acid. | 4 - amino - 1.3 - dimethylbenzene - 6 - sulfonic acid. | ___do___ | Do. |
| 4-nitro-2-aminophenol | 1.3 - dihydroxybenzene - 4-carboxylic acid. | 3-chloroaniline | 2 - aminonaphthalene - 6.8-disulfonic acid. | ___do___ | Do. |
| 1 - amino - 2 - methoxybenzene-5-sulfonic acid. | Resorcinol | o-Nitraniline | Naphthionic acid | ___do___ | Do. |
| 4 - chloro - 2 - amino - 1 - methoxybenzene. | ___do___ | 1 - amino - 2 - methoxybenzene - 5 - sulfonic acid. | 1 - naphthylamine - 5 - sulfonic acid. | Copper (twice). | Do. |

I claim:

1. Azo dyestuffs containing copper in a complex form of the general formula:

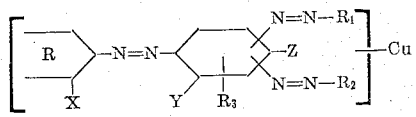

wherein X stands for a member of the group consisting of the hydroxy and the carboxylic acid group, Y and Z stand for a member of the group consisting of the hydroxy, amino and a substituted amino group, R means a member of the group consisting of radicals of the benzene and naphthalene series, $R_1$ and $R_2$ stand for radicals of diazotization components suitable for producing azodyestuffs, at least one of these radicals $R_1$ and $R_2$ belonging to the naphthalene series, and $R_3$ stands for a member of the group consisting of hydrogen, hydroxyl, alkyl, halogen, —COOH and —SO₃H, being in form of their alkali metal salts generally dark, watersoluble powders, dyeing leather generally even shades of excellent fastness to light.

2. Azo dyestuffs containing copper in a complex form of the general formula:

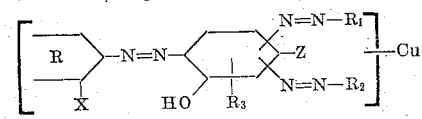

wherein X stands for a member of the group consisting of the hydroxy and the carboxylic acid group, Z stands for a member of the group consisting of the hydroxy, amino and a substituted amino group, R means a member of the group consisting of radicals of the benzene and naphthalene series, $R_1$ and $R_2$ stand for radicals of diazotization components suitable for producing azodyestuffs, at least one of these radicals $R_1$ and $R_2$ belonging to the naphthalene series, and $R_3$ stands for a member of the group consisting of hydrogen, hydroxyl, alkyl, halogen, —COOH and —SO₃H, being in form of their alkali metal salts generally dark, watersoluble powders, dyeing leather generally even shades of excellent fastness to light.

3. Azo dyestuffs containing copper in a complex form of the general formula:

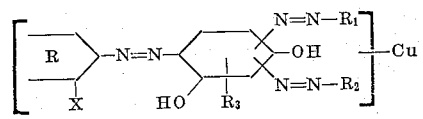

wherein X stands for a member of the group consisting of the hydroxy and the carboxylic acid group, $R_1$ and $R_2$ stand for radicals of diazotization components suitable for producing azodyestuffs, at least one of these radicals $R_1$ and $R_2$ belonging to the naphthalene series, and $R_3$ stands for a member of the group consisting of hydrogen, hydroxyl, alkyl, halogen, —COOH and —SO₃H, being in form of their alkali metal salts generally dark, watersoluble powders, dyeing leather generally even shades of excellent fastness to light.

4. The azo dyestuff corresponding in the form of its free acid to the following formula:

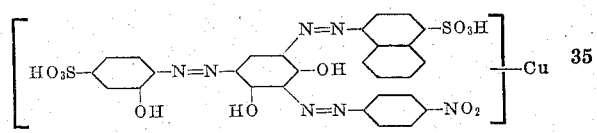

dyeing leather deep reddish-brown shades.

5. The azo dyestuff corresponding in the form of its free acid to the following formula:

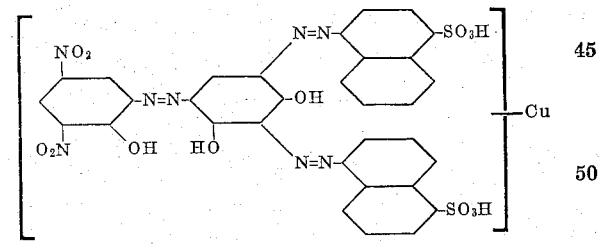

dyeing leather red-brown shades.

6. The azo dyestuff corresponding in the form of its free acid to the following formula:

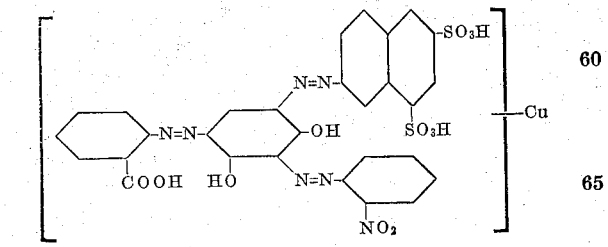

dyeing leather yellow-brown shades.

ERNST FELLMER.

Certificate of Correction

Patent No. 2,175,187. October 10, 1939.

ERNST FELLMER

It is hereby certified that error appears in the printed specification of the above numbered patent requiring correction as follows: Page 2, first column, lines 28 to 36, inclusive, strike out the formula and insert instead the following—

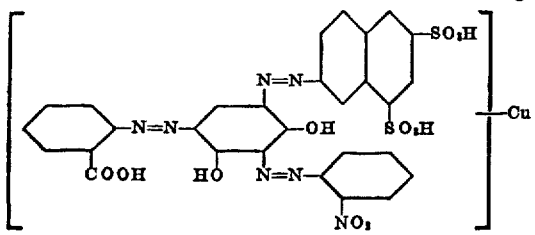

and that the said Letters Patent should be read with this correction therein that the same may conform to the record of the case in the Patent Office.

Signed and sealed this 17th day of September, A. D. 1940.

[SEAL]

HENRY VAN ARSDALE,
*Acting Commissioner of Patents.*